Feb. 7, 1950 J. AICARDI 2,496,367

RADIO BEACON SYSTEM

Filed July 1, 1947

INVENTOR
JOSEPH AICARDI
By Benj. J. Chromy
His Attorney

Patented Feb. 7, 1950 2,496,367

UNITED STATES PATENT OFFICE 2,496,367

RADIO BEACON SYSTEM

Joseph Aicardi, Versailles, France, assignor to Societe Francaise Sadir-Carpentier, Paris, France, a corporation of France Application July 1, 1947, Serial No. 758,333
In France October 18, 1943

Section 1, Public Law 690, August 8, 1946
Patent expires October 18, 1963

3 Claims. (Cl. 343—107)

This invention relates to direction finding methods and radio beacons and more particularly to beacon systems of the kind which give, on one side of the axis or predetermined direction, a predominating modulation of one frequency and on the other side a predominating modulation of another frequency, the two modulations being received with the same intensity on the axis.

The present invention has for its object to provide improved and simplified radio beacons of this kind.

According to this invention a radio beacon system of the kind referred to is characterized in that two high frequency fields both modulated by two frequencies are simultaneously radiated respectively directionally and omni-directionally, the modulations of said fields being such that they are in phase or in phase opposition at the receiver, the resultant field having equal modulation by the two modulation frequencies along one predetermined direction from the transmitter, one modulation frequency predominating on one side and the other on the other of said direction.

The invention will be better understood upon reference to the accompanying drawings which illustrate, by way of example only, a preferred way of carrying out the invention.

Figure 1:
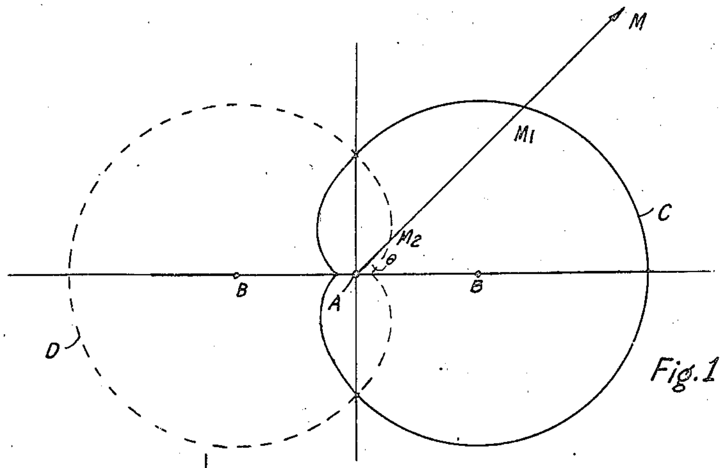
Figure 2:
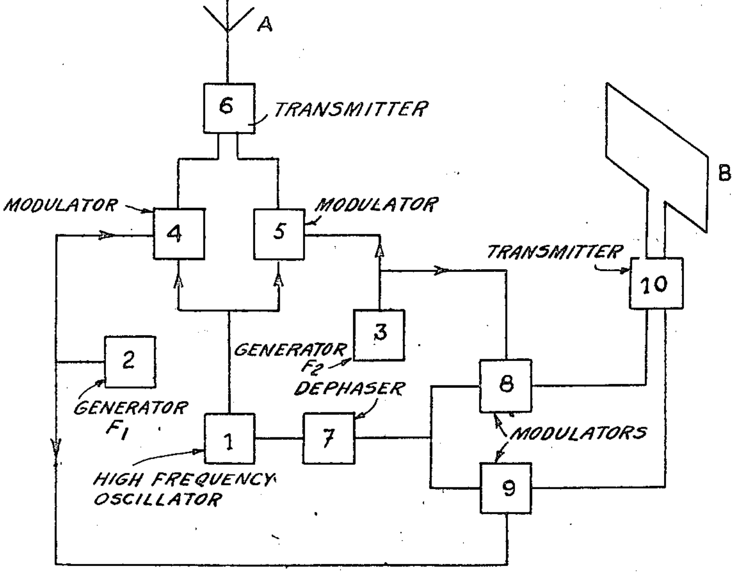

In the drawings, Fig. 1 shows the arrangement of the aerials employed at the transmitter and the field patterns produced thereby and Fig. 2 shows, in block diagram form, the transmitter feeding them.

Referring to Fig. 1 of the drawings, there are illustrated an omni-directional antenna A and a directional antenna represented by the line B—B which corresponds to the plane of the antenna. The field patterns of these antennas are represented by the curves C and D. These curves represent, as is customary, the intensity of the detected current of frequencies $f_1$ and $f_2$, respectively, that would be obtained in the output of a field intensity receiver. In other words, the length AM is proportional to this intensity for a receiver located in the direction AM and making an angle $\theta$ with the direction AB, the dotted line curve D likewise indicates the intensity of the current of frequency $f_2$, likewise present at the output of the same receiver, the length $AM_2$ being proportional to this intensity.

It can be seen that in the direction perpendicular to the plane of the antenna B—B, the two intensities of $f_1$ and $f_2$ are equal; this direction is that of the beacon axis and on one side of this axis the intensity of frequency $f_1$ is greater than that of the frequency $f_2$, and conversely.

The curves C and D shown in Fig. 1 are of the usual shape as obtained for a certain size of antenna; the curves may be mishaped as is well known, depending on whether the distance between the antennas A and B is greater or lesser with respect to the length of the transmitted high frequency wave.

In other words $AM_1$ and $AM_2$ have the value:

$$AM_1=p(ka \text{ plus } f(\theta)) \quad AM_2=p(ka-f(\theta))$$

Since the omni-directional aerial A radiates a field which is modulated equally, preferably to a small extent $k$, by two frequencies $f_1$ $f_2$ the field $H_a$ radiated is given by the expression $$H_a=a[1+k(\sin 2\pi f_1t+\sin 2\pi f_2t)]\sin \omega t$$

where $\omega$ is the high frequency corresponding to the wave length $\lambda$.

The aerial B which is, for example a frame or a combination of two aerials fed in phase opposition, has a polar radiation diagram given by the function $f(\theta)$, this function expressing the intensity of the field provided by the aerial B in a direction making an angle $\theta$ with the reference direction AB as shown in Fig. 1. This aerial or aerial system B emits a field modulated also as regards intensity by the frequencies $f_1$ $f_2$ but with the carrier wave suppressed and the two modulations in opposition so that the field $H_b$ emitted by the aerial B has a form beyond a certain minimum distance given by $$H_b=b[\sin 2\pi f_1t-\sin 2\pi f_2t]f(\theta)\ \sin \omega t.$$

To produce the desired result the currents in aerials A and B are in quadrature as regards high freqeuincy, if the aerial B is constituted by a loop or by two antennas.

For these conditions the field received in any given direction is the sum of the fields produced by antennas A and B and its value H is given by the expression $$H=[a+(ka+bf(\theta))\sin 2\pi f_1t+(ka-bf(\theta))\sin 2\pi f_2t]\sin \omega t$$

which shows that the intensities of modulation of this resultant field, for the frequencies $f_1$ $f_2$ respectively, are proportional to $$k+\frac{b}{a}f(\theta) \text{ and } k-\frac{b}{a}f(\theta)$$

The receiver preferably comprises a single high frequency amplifier with a detector feeding two low frequency amplifiers in parallel, one tuned to $f_1$ and the other to $f_2$ so arranged that at the output terminals of these amplifiers low frequency currents are obtained of the values $$K\left[k+\frac{b}{a}f(\theta)\right] \text{ and } K\left[k-\frac{b}{a}f(\theta)\right] \quad (1)$$

where K is a factor which is alike for both amplifiers.

It will be seen therefore that the beacon axis is defined by the direction where $$ka+bf(\theta)=ka-bf(\theta) \text{ which gives } f(\theta)=0$$

In other words the beacon axis coincides with the direction of zero radiation of the aerial B.

It will also be seen that, when the angle $\theta$ varies, the intensities of the modulations respectively given by Formula 1 vary in opposite manners.

Fig. 2 gives, by way of example, one form of transmitter which is obviously capable of many modifications.

Referring to Fig. 2, the master stage 1 provides the high frequency ($\omega$) and oscillators 2 and 3 provide the low frequencies $f_1$ $f_2$. Modulators 4 and 5 receiving the high and low frequencies $f_1$ and $f_2$ control the transmitter 6 feeding the omni-directional aerial A. Stage 1 also feeds, through a phase shifting network 7 producing a shift of $$\frac{\pi}{2}$$

modulators 8 and 9 which are also fed from oscillators 3 and 2 respectively. These modulators 8 and 9 suppress the carrier frequency and feed in parallel into the transmitter 10 which is connected to the aerial B. The modulators 8 and 9 modulate the transmitter 10 in accordance with the frequencies $f_1$ and $f_2$ in phase opposition.

In the foregoing description it has been supposed that the emitted fields are modulated in the same manner by $f_1$ and $f_2$. This is not essential in carrying out the invention as the desired results can be obtained by fields $H_a$ and $H_b$ as given by the expressions $$H_a=a[1+k(\sin 2\pi f_1t+k_1 \sin 2\pi f_2t)]\sin \omega t$$
$$H_b=b[\sin 2\pi f_1t-k_2 \sin 2\pi f_2t]f(\theta)\sin \omega t$$

with coefficients $k_1$ and $k_2$ positive and differing from unity. With these fields the intensities of modulation are proportional to:

$$ka+bf(\theta) \text{ and } kk_1a-k_2bf(\theta)$$

and vary in opposite directions with variations of $\theta$, giving an axis defined by the equations:

$$ka+bf(\theta)=kk_1a-k_2bf(\theta)$$

whence $$f(\theta)=\frac{ka}{b}\,\frac{k_1-1}{1+k_2}$$

It will thus be seen that $f(\theta)$ depends in general on the ratios of the intensities of modulation of the emitted fields, that is to say, on the coefficients $k$, $k_1$ and $k_2$ except in the special case $k_1=1$.

From this it follows that if $k_1=1$, the advantage of a very stable axis direction is obtained, while if this case is not taken, there is the advantage that the direction of the axis can be varied at will without changing the positions of the aerials A and B.

If acoustic methods of comparing the frequencies $f_1$ $f_2$ are employed at the receiver these frequencies must, of course, be audio, but if other methods of comparison are employed, for example optical or electrical, it is not necessary for $f_1$ $f_2$ to be audio frequencies—they could, for example, be supersonic.

It will be seen that the fields $H_a$ and $H_b$ are in phase at the receiver. As indicated above, this is obtained by feeding the aerials A and B in quadrature as respects high frequency in the most usual case where B is constituted by a loop or by an assembly of two antennas fed in phase opposition. It may be pointed out, however, that B can be constituted by an aerial or aerial system of some other style so long as it is fed in such manner that the fields of A and B are in phase or in phase opposition at the receiver, the phase of the field due to the action of the aerial B being, for that, chosen independent of the direction of transmission.

The polar diagram of radiation of the antenna A need not be circular. Indeed it can with advantage have maximum radiation in the beacon direction, i. e. the equi-signal direction. Accordingly the term omni-directional, as employed in this specification and claims, should not be read in the strict sense of meaning equal radiation in all directions, but in a more general sense to distinguish an aerial such as an open aerial, for example, having radiation strengths (not necessarily equal) in all or nearly all directions, from an aerial, such as a loop aerial, having pronounced radiation in one or more specific directions and little or none in others

What I claim is:

1. A radio beacon transmitter system comprising an omnidirectional antenna, a first transmitter connected to said omnidirectional antenna, modulator means connected to modulate said first transmitter in accordance with a pair of modulation frequencies, a directional antenna, a second transmitter connected to said directional antenna, means for modulating said second transmitter in accordance with said pair of modulation frequencies, and a phase control device for defining the relative phase between the high frequency waves transmitted by said omnidirectional antenna and said directional antenna to produce a resultant field having substantially equal modulation by the two modulating frequencies along one predetermined direction from the transmitter system, said resultant field being further characterized in that one of the modulating frequencies predominates on one side of the predetermined direction and the other modulating frequency predominates on the other side of said predetermined direction.

2. A radio beacon transmitter system comprising an omnidirectional antenna, a first transmitter connected to said omnidirectional antenna, a high frequency oscillator, modulator means connected between said high frequency oscillator and said first transmitter, auxiliary oscillator means adapted to generate a pair of modulation frequencies, said auxiliary oscillator means being connected to said modulator means for modulating said first transmitter in accordance with said pair of modulation frequencies, a directional antenna, a second transmitter connected to said directional antenna, means for modulating said second transmitter in accordance with said pair of modulation frequencies, and a phase control device for defining the relative phase between the high frequency waves transmitted by said omnidirectional antenna and said directional antenna to produce a resultant field having substantially equal modulation by the two modulating frequencies along one predetermined direction from the transmitter system, said resultant field being further characterized in that one of the modulating frequencies predominates on one side of the predetermined direction and the other modulating frequency predominates on the other side of said predetermined direction.

3. A radio beacon transmitter system comprising an omnidirectional antenna, a first transmitter connected to said omnidirectional antenna, a high frequency oscillator, modulator means connected between said high frequency oscillator and said first transmitter, auxiliary oscillator means adapted to generate a pair of modulation frequencies, said auxiliary oscillator means being connected to said modulator means for modulating said first transmitter in accordance with said pair of modulation frequencies, a directional antenna, a second transmitter connected to said directional antenna, modulating means for said second transmitter, means for controlling said modulating means in accordance with said pair of modulation frequencies for modulating said second transmitter, and a phase control device connected between said high frequency oscillator and said modulating means for defining the relative phase between the high frequency waves transmitted by said omnidirectional antenna and said directional antenna to prod field having substantially equal the two modulating frequencies determined direction from the tr tem, said resultant field being fur ized in that one of the modulat predominates on one side of the direction and the other modula predominates on the other side of mined direction.

JOSEP

REFERENCES CITE

The following references are of file of this patent:

UNITED STATES PAT

| Number | Name |
|---|---|
| 1,991,476 | Thomas ---------- |
| 2,107,155 | Kleinkauf et al. --- |
| 2,141,281 | Southworth ------- |
| 2,433,351 | Earp -------------- |

FOREIGN PATENT

| Number | Country |
|---|---|
| 525,182 | Great Britain ----- |